(12) United States Patent
Chiba

(10) Patent No.: US 8,867,060 B2
(45) Date of Patent: Oct. 21, 2014

(54) INFORMATION PROCESSING APPARATUS THAT PREVENTS UNAUTHORIZED ACCESS, METHOD OF CONTROLLING THE SAME, AND STORAGE MEDIUM

(71) Applicant: Canon Kabushiki Kaisha, Tokyo (JP)

(72) Inventor: Shinichi Chiba, Tokyo (JP)

(73) Assignee: Canon Kabushiki Kaisha (JP)

( * ) Notice: Subject to any disclaimer, the term of this patent is extended or adjusted under 35 U.S.C. 154(b) by 128 days.

(21) Appl. No.: 13/681,573

(22) Filed: Nov. 20, 2012

(65) Prior Publication Data

US 2013/0141749 A1 Jun. 6, 2013

(30) Foreign Application Priority Data

Dec. 2, 2011 (JP) ................................. 2011-264634

(51) Int. Cl.
*H04N 1/44* (2006.01)
*H04N 1/00* (2006.01)

(52) U.S. Cl.
CPC ...... *H04N 1/4406* (2013.01); *H04N 2201/0049* (2013.01); *H04N 2201/0091* (2013.01); *H04N 2201/0055* (2013.01); *H04N 2201/0093* (2013.01); *H04N 2201/0044* (2013.01); *H04N 1/00204* (2013.01); *H04N 1/00127* (2013.01); *H04N 2201/0082* (2013.01); *H04N 1/00408* (2013.01)
USPC ......................................... 358/1.14; 358/1.15

(58) Field of Classification Search
USPC ............................................... 358/1.14, 1.15
See application file for complete search history.

(56) References Cited

U.S. PATENT DOCUMENTS

2010/0253976 A1* 10/2010 Kasai .......................... 358/1.15
2013/0332993 A1* 12/2013 Nagasaki et al. ................. 726/3

FOREIGN PATENT DOCUMENTS

JP 2003223307 A 8/2003

OTHER PUBLICATIONS

Machine translation for JP 2003-223307, IDS.*

* cited by examiner

*Primary Examiner* — Qian Yang
(74) *Attorney, Agent, or Firm* — Rossi, Kimms & McDowell LLP

(57) ABSTRACT

An information processing apparatus which is capable of preventing unauthorized access from an external apparatus, such as a PC, and improving user-friendliness. A wired communication section and a wireless communication section receive requests for acquiring screen data from external apparatuses. When a request is received via wireless communication, a CPU determines whether or not a security method used for the wireless communication is a predetermined security method. When the CPU determines that the security method is not the predetermined security method, the CPU and an operation panel cause screen data responsive to the received request to be transmitted to the external apparatus on condition that a predetermined input operation is performed on the operation panel.

7 Claims, 5 Drawing Sheets

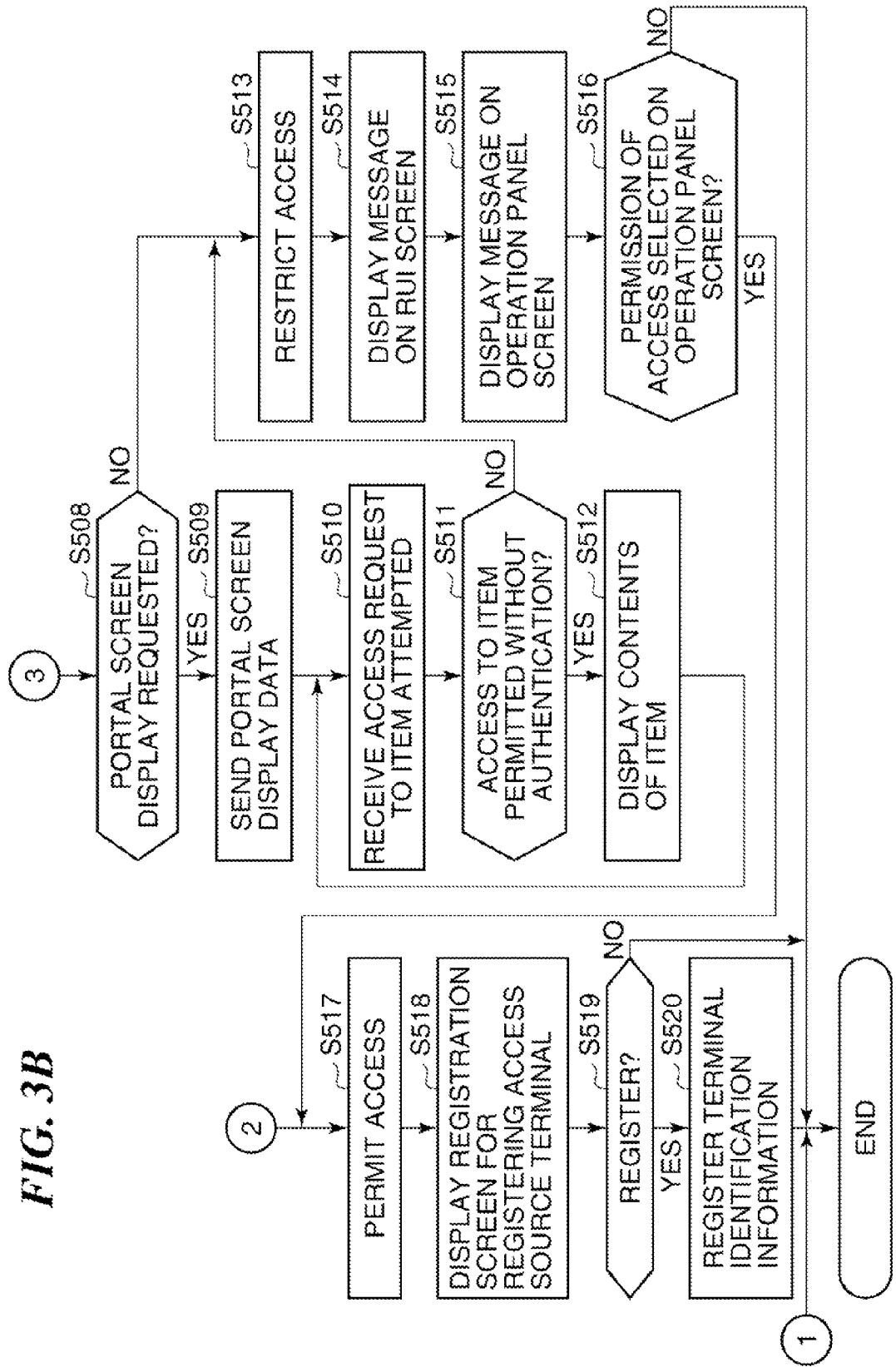

INFORMATION PROCESSING APPARATUS THAT PREVENTS UNAUTHORIZED ACCESS, METHOD OF CONTROLLING THE SAME, AND STORAGE MEDIUM

BACKGROUND OF THE INVENTION

1. Field of the Invention

The present invention relates to an information processing apparatus, a method of controlling the same, and a storage medium, and more particularly to an information processing apparatus equipped with a wireless communication function.

2. Description of the Related Art

As a type of information processing apparatus, there has been used an image forming apparatus, such as a copying machine, a printer, or a facsimile machine. Further, in recent years, there has been known an image forming apparatus which is equipped with a wireless communication function, such as a wireless LAN function. If a wireless LAN is used, wiring, such as cables, can be dispensed with, thereby making it possible to use the image forming apparatus e.g. from an external apparatus (PC, for example) which exists outside a building where the image forming apparatus is installed.

Since the use of the wireless LAN makes it possible to access the image forming apparatus from the external apparatus without wiring, it is possible for a user who is not desired by an administrator to access the image forming apparatus. To prevent such undesirable access, authentication using a WEP (Wired Equivalent Privacy) key is performed when the external apparatus connects to the image forming apparatus using the wireless LAN.

On the other hand, there is a wireless LAN connection that omits authentication (hereinafter referred to as the "authentication-free wireless connection"). If the authentication-free wireless connection is used, an unspecified number of external apparatuses (personal computers (PCs), for example) sometimes make unauthorized use of the image forming apparatus to perform print jobs and the like.

Particularly if a web browser function equipped in the external apparatuses is used, it is possible for a user not only to view but also to edit setting information and apparatus information of the image forming apparatus and an address book recorded in the image forming apparatus, even if the user is not at a place where the image forming apparatus is installed.

When the image forming apparatus is in a state of the authentication-free wireless connection, external apparatuses existing within a range where they can wirelessly connect to the image forming apparatus can access the image forming apparatus using the web browser function. As a result, there is a fear that private information, such as the address book, recorded in the image forming apparatus is stolen via one or some of the unspecified number of external apparatuses.

As a method of restricting remote access to an information processing apparatus, such as an image forming apparatus, there has been proposed one in which when an access request is sent from an external apparatus, the image forming apparatus extracts an IP address and an MAC address for identifying the external apparatus from the access request, and when the extracted IP address and MAC address match the IP address and MAC address registered in advance, the image forming apparatus permits the external apparatus to access the same (see e.g. Japanese Patent Laid-Open Publication No. 2003-223307). The technique disclosed in Japanese Patent Laid-Open Publication No. 2003-223307 thus permits only an external apparatus which is approved in advance by the administrator of the image forming apparatus to access the image forming apparatus.

As described above, according to Japanese Patent Laid-Open Publication No. 2003-223307, an external apparatus is permitted to access the image forming apparatus on condition that identification information on the external apparatus is registered in advance. To register the identification information in advance, the external apparatus is required to be approved in advance by the administrator of the image forming apparatus. Further, in order that the external apparatus is permitted to access the image forming apparatus, it is required to accurately register the identification information on the external apparatus in the image forming apparatus.

Under such circumstances, in a case where an external apparatus, such as a PC, is newly installed in a business or an office, or in a case where an external apparatus acquires an IP address different from an IP address (identification information) registered in a DHCP (Dynamic Host Configuration Protocol) server, it is required to send identification information on the external apparatus to the administrator of the image forming apparatus and request the administrator to register the identification information. This brings about the problem of lack of user-friendliness. In addition, when it is impossible to perform registration processing e.g. due to absence of the administrator, the external apparatus cannot access the image forming apparatus before the identification information is registered. This also brings about the problem of lack of user-friendliness.

SUMMARY OF THE INVENTION

The present invention provides an information processing apparatus which is capable of preventing unauthorized access from an external apparatus, such as a PC, and improving user-friendliness, a method of controlling the information processing apparatus, and a storage medium.

In a first aspect of the present invention, there is provided an information processing apparatus comprising a reception unit configured to receive a request for acquiring screen data from an external apparatus, a determination unit configured to determine, when the request is sent via wireless communication, whether or not a security method used for the wireless communication is a predetermined security method, and a control unit configured to, when the determination unit determines that the security method used for the wireless communication is not the predetermined security method, cause screen data responsive to the received request to be transmitted to the external apparatus on condition that a predetermined input operation is performed on a console section provided in the information processing apparatus.

In a second aspect of the present invention, there is provided a method of controlling an information processing apparatus, comprising receiving a request for acquiring screen data from an external apparatus, determining, when the request is sent via wireless communication, whether or not a security method used for the wireless communication is a predetermined security method, and causing, when it is determined that the security method used for the wireless communication is not the predetermined security method, screen data responsive to the received request to be transmitted to the external apparatus on condition that a predetermined input operation is performed on a console section provided in the information processing apparatus.

In a third aspect of the present invention, there is provided a non-transitory computer-readable storage medium storing a computer-executable control program for causing a computer to execute a method of controlling an information processing apparatus, wherein the method comprises receiving a request for acquiring screen data from an external apparatus, determining, when the request is sent via wireless communication, whether or not a security method used for the wireless communication is a predetermined security method, and causing, when it is determined that the security method used for the wireless communication is not the predetermined security method, screen data responsive to the received request to be transmitted to the external apparatus on condition that a predetermined input operation is performed on a console section provided in the information processing apparatus.

According to the present invention, it is possible to prevent unauthorized access from an external apparatus, such as a PC, and improve user-friendliness.

Further features of the present invention will become apparent from the following description of exemplary embodiments with reference to the attached drawings.

BRIEF DESCRIPTION OF THE DRAWINGS

FIGS. 3A and 3B are a flowchart of an access control process executed when the image forming apparatus shown in FIG. 1 has received an access request.

DESCRIPTION OF THE EMBODIMENTS

The present invention will now be described in detail below with reference to the accompanying drawings showing embodiments thereof.

Figure 1:
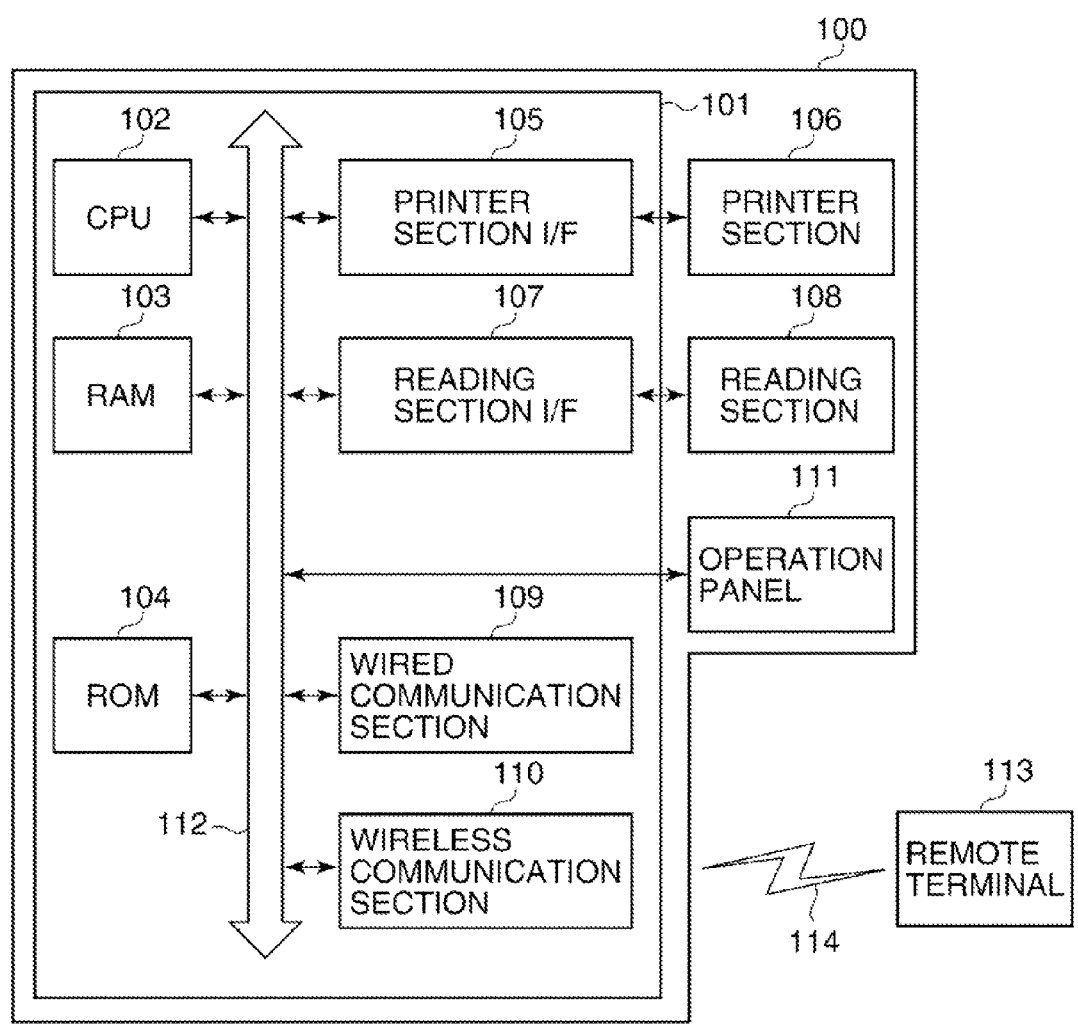
FIG. 1 is a block diagram of the hardware configuration of an image forming apparatus as an information processing apparatus according to an embodiment of the present invention.

FIG. 1 is a block diagram of the hardware configuration of an image forming apparatus as an information processing apparatus according to an embodiment of the present invention.

FIG. 1 shows the image forming apparatus as an information processing apparatus. The image forming apparatus 100 comprises a controller 101, a printer section 106, a reading section 108, and an operation panel (console section) 111. The printer section 106, the reading section 108 and the operation panel 111 are controlled by the controller 101.

The controller 101 comprises a CPU 102, a RAM 103, a ROM 104, a printer section interface (I/F) 105, a reading section interface (I/F) 107, a wired communication section 109, and a wireless communication section 110. The CPU 102, the RAM 103, the ROM (e.g. an EEPROM (Electrically Erasable Programmable ROM)) 104, the printer section interface 105, the reading section interface 107, the wired communication section 109, and the wireless communication section 110 are connected to each other by a system bus 112. The CPU 102 executes control according to various control programs stored in a program area of the ROM 104. When the CPU 102 executes the control programs, the control programs are loaded from the ROM 104 into the RAM 103, for example. Note that the control programs may be stored in a hard disk drive (HDD: not shown).

The wired communication section 109 communicates with a remote terminal (external apparatus) 113 via a wired LAN (not shown). The wireless communication section 110 communicates with the remote terminal 113 via a wireless LAN 114. Although not shown, communication using the wireless LAN 114 is carried out via a wireless access point (wireless AP).

Although in the illustrated example, only the remote terminal 113 is shown as an external apparatus, there may exist a plurality of remote terminals. Further, the remote terminal 113 is equipped with a web browser function, and is capable of viewing or editing apparatus information, telephone book (address book) information, department management information, and so forth, which are stored in the image forming apparatus 100, using the web browser function.

When the remote terminal 113 accesses the image forming apparatus 100 using the wireless LAN 114, the remote terminal 113 delivers an access request signal formed by adding at least apparatus identification information for identifying the image forming apparatus to be accessed by the remote terminal 113 and terminal identification information for identifying the remote terminal 113. The access request signal is given to the CPU 102 via the wireless communication section 110.

When the apparatus identification information received by the CPU 102 matches apparatus identification information of the self apparatus, and at the same time the terminal identification information received by the CPU 102 matches terminal information registered in the ROM 104 in advance, the CPU 102 gives an access permission signal to the remote terminal 113 via the wireless communication section 110, as described hereinafter. This makes it possible for the remote terminal 113 to send a processing request, such as a print job request, to the image forming apparatus 100. The image forming apparatus 100 performs job processing according to the processing request.

Note that when the CPU 102 rejects an access from a remote terminal, terminal identification information of the remote terminal whose access has been rejected is stored as rejected terminal information e.g. in the ROM 104.

The printer section interface 105 outputs image data from the CPU 102 to the printer section (printer engine) 106. The reading section interface 107 inputs image data obtained by reading an original by the reading section (scanner engine) 108 to the CPU 102. The CPU 102 performs predetermined processing on the input image data, and then outputs the same as print image data to the printer section interface 105.

Further, the CPU 102 displays characters and symbols on a display section of the operation panel 111 using font information stored in the font area of the ROM 104. Furthermore, the CPU 102 performs processing according to instruction information received by the operation panel 111.

Note that the data area of the ROM 104 stores e.g. apparatus information of the image forming apparatus 100, telephone book information on a user, management information on a department to which the user belongs, and so forth, as setting information (also referred to as "setting items"). The CPU 102 reads out and updates the setting information as required.

Figure 2:
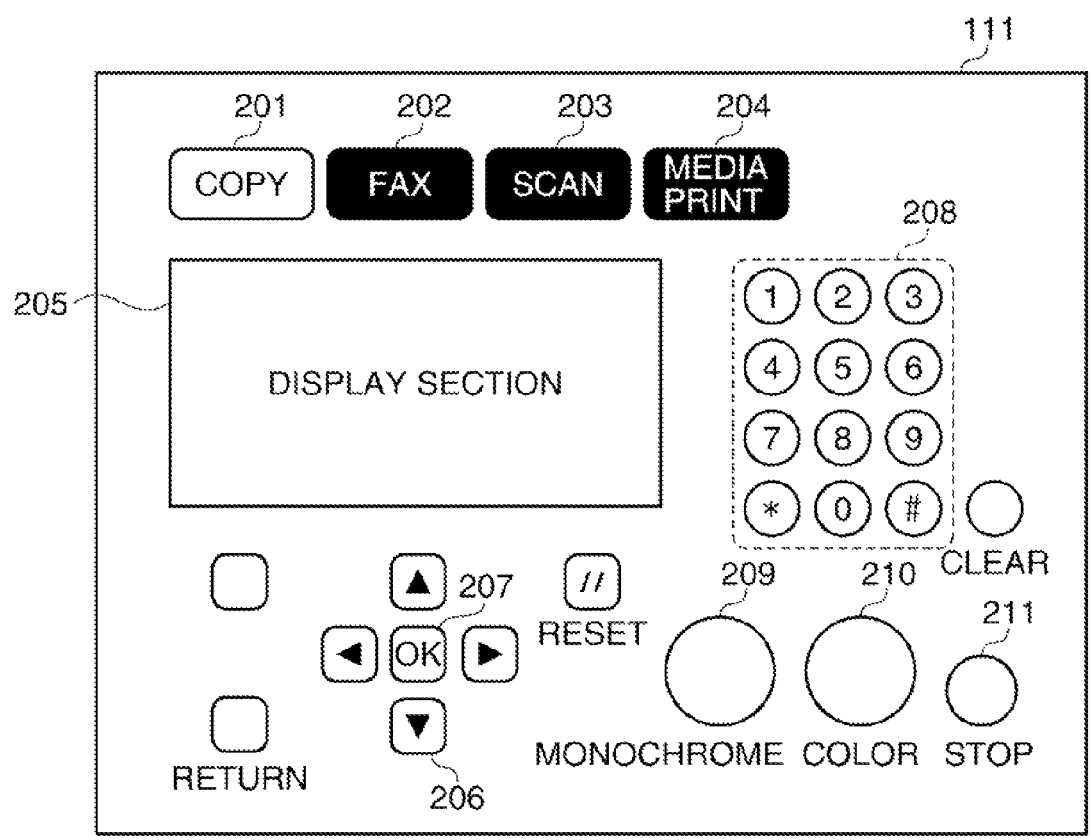
FIG. 2 is a schematic view of an operation panel appearing in FIG. 1.

FIG. 2 is a schematic view of the operation panel 111 shown in FIG. 1.

Referring to FIG. 2, the operation panel 111 is provided with a display section 205. Settings and status of the image forming apparatus 100, for example, are displayed on the display section 205. Arrow keys 206 are used for moving e.g.

a cursor displayed on the display section 205. The arrow keys 206 are four buttons, i.e. up, down, left, and right buttons, and an OK key 207 is disposed in the center thereof. When the OK key 207 is depressed, a setting or a response to an inquiry is finally determined.

Further, the operation panel 111 is provided with function keys 201 to 204 for selecting a copy function, a FAX function, a scan function, a media print function, and so forth. By depressing the function keys 201 to 204, respective processes associated with these functions are performed.

For example, when the user desires to change a copy setting (sheet size), the user depresses the function key 201, and in response to this operation, the CPU 102 causes a copy function screen to be displayed on the display section 205. Then, the user selects an item (sheet size) desired to be changed, using the arrow keys 206, and depresses the OK key 207. In response to this, the CPU 102 causes a selectable configuration screen to be displayed on the display section 205. Then, when the user moves the cursor to a desired setting position using the arrow keys 206, and depresses the OK key 207, a desired copy setting is finally determined.

Note that the operation panel 111 is provided with ten keys 208, a monochrome key 209, a color key 210, a stop key 211, and so forth. The functions of these keys are not directly related to the present invention, and hence description thereof is omitted.

Figure 3A:
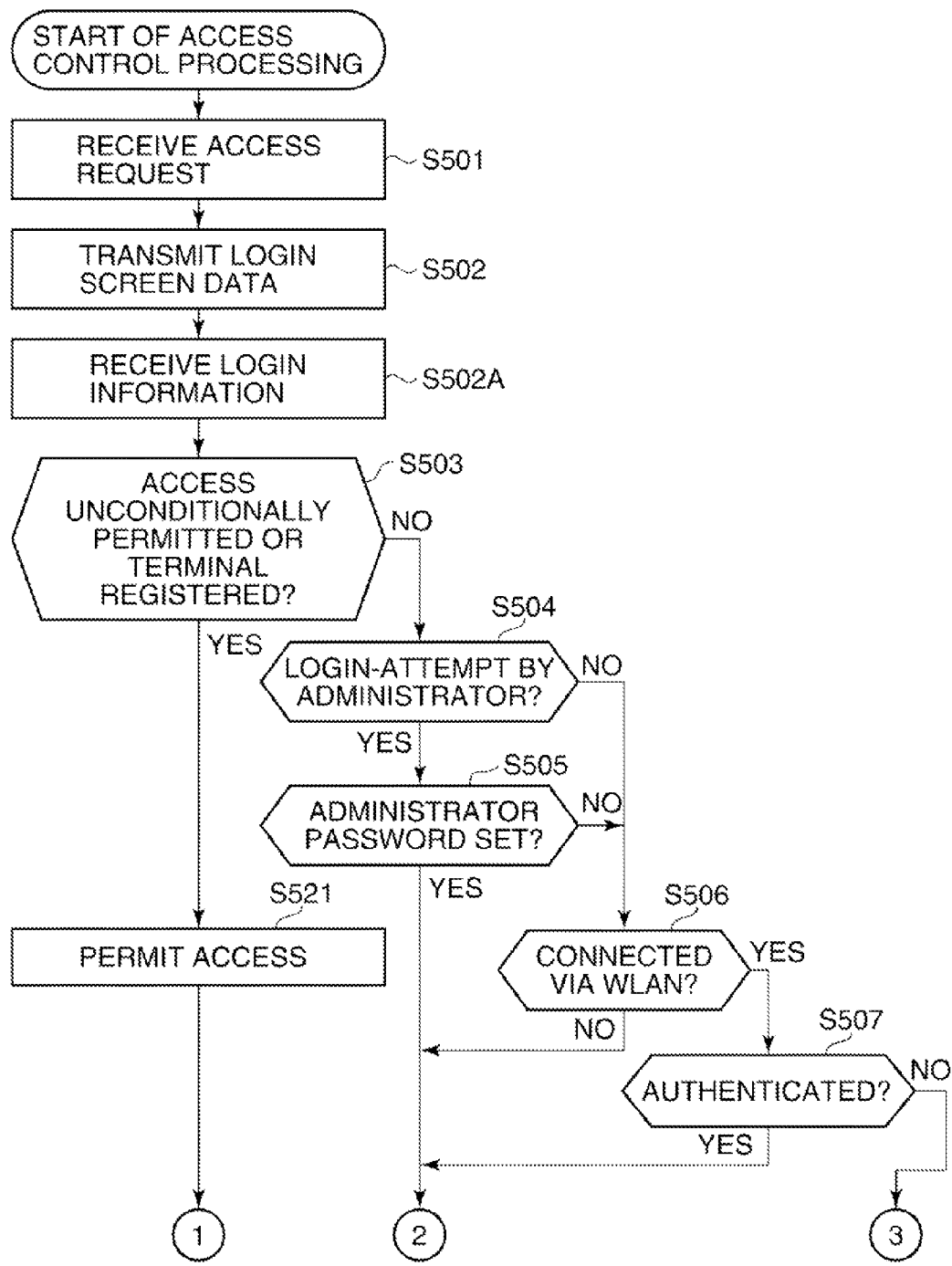

FIGS. 3A and 3B are a flowchart of an access control process executed by the image forming apparatus 100 shown in FIG. 1 when the image forming apparatus 100 has received an access request from any of a plurality of terminals including the remote terminal 113. A control program for executing the access control process is stored in the ROM 104, and is executed by the CPU 102. Note that in the present embodiment, the term "access request" is intended to mean a request transmitted from a web browser e.g. of the remote terminal 113, which is a request conforming to the HTTP protocol. Specifically, the request is e.g. a request for acquiring screen data stored in the image forming apparatus 100.

Referring to FIGS. 1, 3A and 3B, terminal identification information of remote terminals capable of using the image forming apparatus 100 is registered in advance in the image forming apparatus 100. When an access request is sent from a remote terminal, the image forming apparatus 100 determines whether or not terminal identification information of the remote terminal having made the access request is registered to thereby determine whether or not to permit access (perform authentication).

Further, the image forming apparatus 100 can be set to an access unconditionally-permitted state in which an access request is unconditionally approved to permit access. This access unconditionally-permitted state is set via the operation panel 111 by an administrator who manages the image forming apparatus 100. In the access unconditionally-permitted state, the image forming apparatus 100, i.e. the CPU 102 does not perform the above-mentioned authentication.

Further, the image forming apparatus 100 can be set to a portal display-permitted state in which the display of an initial screen after login (portal screen) is unconditionally permitted. Further, the image forming apparatus 100 can be set to an item access unconditionally-permitted state in which access to each of items displayed on the initial screen is unconditionally permitted. The setting of each of the above-mentioned states is performed by the administrator using the operation panel 111.

Now, it is assumed that the remote terminal 113 sends an access request (remote user interface (RUI) access request) to the image forming apparatus 100. The CPU 102 of the image forming apparatus 100 receives the access request from the remote terminal 113 (step S501). In response to this access request, the CPU 102 transmits data of a login screen (e.g. an HTML file) to the remote terminal 113 in order to display the login screen as a remote user interface (RUI) screen on a display section (not shown) of the remote terminal 113 (step S502). Login information, for example, is input from the remote terminal 113 via the login screen.

Note that the login screen includes an administrator login checkbox (not shown). To log into the image forming apparatus 100 as an administrator, the user enters a check mark in the administrator login checkbox, and inputs an administrator login password (administrator password) as login information.

When the login information input is received from the login screen (step S502A), the CPU 102 determines whether the image forming apparatus 100 is set to the access unconditionally-permitted state or whether terminal identification information of the remote terminal of the source of the access request is registered in the ROM 104 (step S503). If the image forming apparatus 100 is not set to the access unconditionally-permitted state and at the same time the terminal identification information is not registered in the ROM 104 (NO to the step S503), the CPU 102 determines whether or not an administrator is attempting to login to the image forming apparatus 100 (step S504). That is, the CPU 102 determines whether or not a check mark has been entered in the administrator login checkbox.

To log into the image forming apparatus 100 as an administrator, the user is required to input the administrator login password as mentioned above. The administrator login password is stored in advance e.g. in the ROM 104. If it is determined that an administrator is attempting to login to the image forming apparatus 100 (YES to the step S504), the CPU 102 proceeds to a step S505 wherein it is determined whether or not the administrator login password has been set.

On the other hand, if it is determined that not an administrator but an ordinary user is attempting to login to the image forming apparatus 100 (NO to the step S504), the CPU 102 determines that there is a possibility that the login is not secure since ordinary users can log in without a password, and determines whether or not the image forming apparatus 100 is connected to the network via the wireless LAN 114 (i.e. via wireless communication) (step S506). If it is determined that the image forming apparatus 100 is connected to the network via wired communication, not via wireless communication (NO to the step S506), the CPU 102 proceeds to a step S517.

If it is determined that the image forming apparatus 100 is connected to the network via wireless communication (YES to the step S506), the CPU 102 determines whether or not the wireless access point (wireless AP) used in the wireless communication with the remote terminal 113 employs a security method requiring authentication (step S507). For example, the CPU 102 determines whether or not WEP (Wired Equivalent Privacy) or WPA (Wi-Fi Protected Access) is employed as the security method (encryption method). In other words, in the step S507, the CPU 102 determines whether or not a security level used in the wireless LAN (WLAN) 114 is not lower than a predetermined level.

If it is determined that the wireless access point does not employ a security method requiring authentication (NO to the step S507), i.e. if it is determined that the security level used in the wireless LAN 114 is lower than the predetermined level, the CPU 102 proceeds to a step S508. On the other hand, if it is determined that the security level used in the wireless LAN 114 is not lower than the predetermined level (YES to the step S507), the CPU 102 proceeds to the step S517.

In the step S508, in order to cause a screen to be displayed according to the access request from the remote terminal 113, the CPU 102 checks a URL designated by the received access request to determine whether or not the access request is a portal screen display request (step S508). According to a result of the determination, i.e. according to the access request, the CPU 102 transmits screen data, i.e. an HTML file associated with the URL to the remote terminal 113 via the wireless communication section 110. Specifically, if it is determined that the access request is a request for displaying a portal screen (also referred to as an "initial screen" or a "top screen") (YES to the step S508), data of the portal screen is transmitted to the remote terminal 113 to display the portal screen on the remote terminal 113 (step S509). This portal screen displayed on the remote terminal 113 displays apparatus information of the mage forming apparatus 100. Further, the portal screen also displays buttons (items) for use in shifting to a screen for displaying e.g. telephone book information or department management information on the user. If the user operates one of the buttons on the portal screen displayed on the remote terminal 113, an access request to an item associated with the operated button is transmitted from the remote terminal 113 to the image forming apparatus 100, and the image forming apparatus 100 receives the access request (S510). For example, when the button (item) for use in displaying the telephone book information is operated on the remote terminal 113, the image forming apparatus 100 receives a request for displaying the screen for displaying the telephone book information from the remote terminal 113. Upon receipt of the access request to the item selected on the portal screen, the CPU 102 determines whether or not the selected item is an item which users are permitted to access without authentication (S511). If the selected item is an item which users are permitted to access without authentication, the CPU 102 permits access to the selected item to display the same (S512), whereas if not, the CPU 102 proceeds to a step S513 to place restrictions on the access.

On the other hand, if it is determined that the access request is not the portal screen display request (NO to the step S508), the CPU 102 places restrictions on the access (step S513). Then, the CPU 102 transmits data for displaying a remote user interface (RUI) screen shown in FIG. 4 on the display section of the remote terminal 113, to the remote terminal 113, to thereby notify the remote terminal 113 that restrictions on the access has been placed (step S514).

Figure 4:
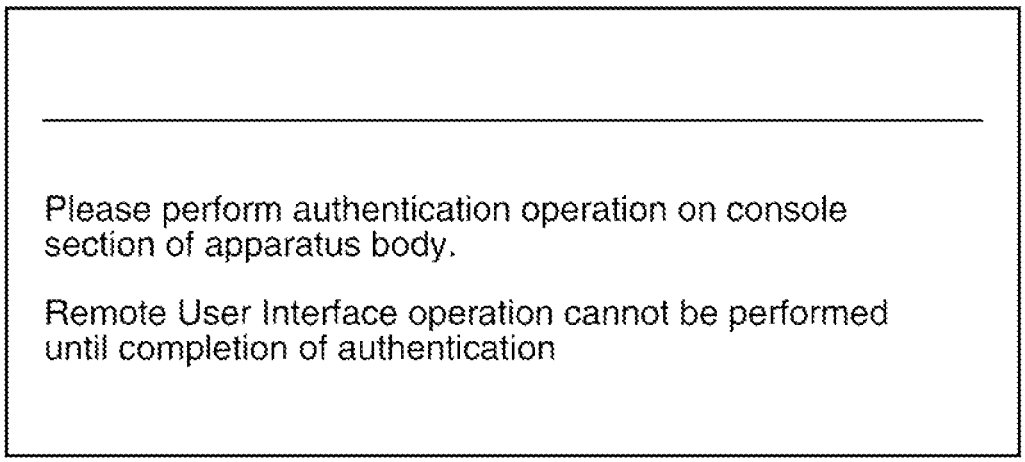
FIG. 4 is a view of an example of an apparatus operation instruction screen displayed on a remote terminal shown in FIG. 1.

FIG. 4 is a view of an example of an apparatus operation instruction screen (RUI screen) displayed on the remote terminal 113 shown in FIG. 1.

The apparatus operation instruction screen (RUI screen) displayed on the remote terminal 113 displays a message saying that the access by the remote terminal 113 is restricted, and how to remove the restrictions on the access. Referring again to FIGS. 3A and 3B, after causing the apparatus operation instruction screen to be displayed on the remote terminal 113, the CPU 102 displays an access approval confirmation screen, described hereinafter, on the operation panel 111 of the image forming apparatus 100 (step S515).

Figure 5:
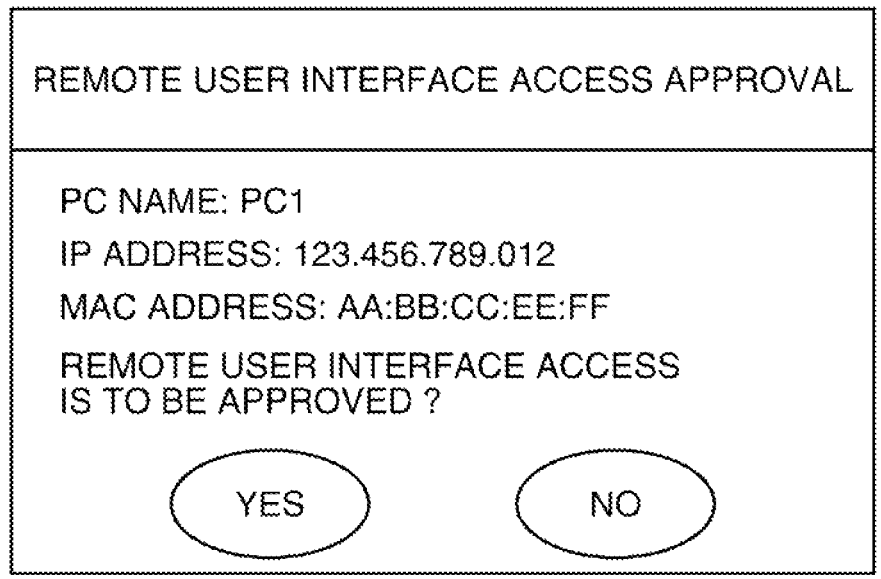
FIG. 5 is a view of an example of an access approval confirmation screen displayed on the operation panel appearing in FIG. 1.

FIG. 5 is a view of an example of the access approval confirmation screen displayed on the operation panel 111 of the image forming apparatus 100 shown in FIG. 1.

As described above, when the remote terminal 113 logs into the image forming apparatus 100, the terminal identification information is sent from the remote terminal 113 to the image forming apparatus 100. The terminal identification information includes e.g. a terminal name, an IP (Internet Protocol) address, and an MAC (Media Access Control) address.

The CPU 102 displays the terminal name, the IP address, and the MAC address of the remote terminal 113 that has sent the access request, on the access approval confirmation screen, and displays a message indicating whether or not to approve a processing request (permit access) from the remote terminal 113.

After the access approval confirmation screen has been displayed, when the user uses the arrow keys 206 on the operation panel 111 of the image forming apparatus 100 to select "YES (i.e. permission of access)" and depress the OK key 207 (i.e. perform a predetermined input operation), the CPU 102 approves the processing request (permits access) from the remote terminal 113.

The CPU 102 determines whether or not the permission of access has been selected on the access approval confirmation screen (step S516). If the permission of access has not been selected (NO to the step S516), the CPU 102 terminates the access processing (i.e. the CPU 102 stops reception of the processing request).

Note that after the access approval confirmation screen has been displayed, if no operation is performed even after the lapse of a predetermined time period, the CPU 102 terminates the access processing.

On the other hand, if the permission of access has been selected (YES to the step S516), the CPU 102 approves the processing request (permits access) to a selected item (step S517), and proceeds to a step S518.

In the step S518, the CPU 102 displays a registration screen for newly registering the remote terminal 113 having made the access request, on the operation panel 111.

Although not shown, at least a registration button and a cancel button are displayed on the registration screen. The CPU 102 determines whether or not either the registration button or the cancel button has been depressed on the registration screen (step S519). If the registration button has been depressed (YES to the step S519), the CPU 102 registers terminal identification information of the remote terminal 113 having sent the access request in the ROM 104 (step S520).

If the cancel button has been depressed (NO to the step S519), the CPU 102 terminates the access processing without registering the terminal identification information of the remote terminal 113 having made the access request. Note that if a predetermined time period has elapsed after the display of the registration screen, the CPU 102 determines that registration of the remote terminal 113 having made the access request has been canceled, and does not register the terminal identification information of the remote terminal 113.

If it is determined in the step S503 that the image forming apparatus 100 is in the access unconditionally-permitted state or the terminal identification information of the remote terminal 113 has been registered (YES to the step S503), the CPU 102 permits access by the remote terminal 113 having made the access request (step S521), followed by terminating the present process.

If it is determined in the step S505 that the administrator login password has been set (YES to the step S505), the CPU 102 proceeds to the step S517 to approve the processing request (permit access). Further, if it is determined in the step S506 that the image forming apparatus 100 is connected to the network not via the wireless LAN 114 (NO to the step S506), the CPU 102 determines that the image forming apparatus 100 is connected to the network via the wired LAN, and proceeds to the step S517. If it is determined that the wireless access point employs a security method requiring authentication (YES to the step S507), the CPU 102 also proceeds to the step S517.

Note that examples of the items referred to in the description of the access control process in FIGS. 3A and 3B includes setting information, such as the apparatus information of the image forming apparatus 100, the telephone book information on the user, and the management information on the department to which the user belongs.

In the above-described example, in the case where the access by the remote terminal 113 having made the access request is restricted, the CPU 102 permits the access when the permission of access (YES) is selected from the access approval confirmation screen displayed on the operation panel 111. Instead of this, a method may be employed in which a screen designating a specific operation method is displayed on the remote terminal 113, and the access by the remote terminal 113 is permitted when the user performs operation according to the specific operation method on the operation panel 111. For example, a message of "Please input the following passcode to the image forming apparatus: 1234" may be displayed on the remote terminal 113, and then, when the user inputs the designated passcode using the operation panel 111 (performs a predetermined input operation), the CPU 102 authenticates the remote terminal 113 and approves the processing request (permits access). This makes it possible to more reliably prevent the remote terminal 113 from being authenticated by an erroneous operation by a third party than in the case of the example shown in FIG. 5.

As described hereinabove, in the present embodiment, the image forming apparatus is configured such that when an access request to the image forming apparatus 100 has been received from the remote terminal 113 via the wireless LAN 114, if the remote terminal 113 is not a registered one, only a user who can go to and access the image forming apparatus 100 is permitted to view confidential processing items requiring secrecy. This makes it possible to prevent unauthorized access and enables the user to view information items even if the remote terminal 113 is not registered in advance, which improves user-friendliness.

As is apparent from the above description, in the example illustrated in FIG. 1, the wired communication section 109 and the wireless communication section 110 function as a reception unit. Further, the CPU 102 functions as a determination unit, and the CPU 102 and the wireless communication section 110 function as a control unit. Furthermore, the CPU 102 and the operation panel 111 function as a setting unit, and the CPU 102 and the wireless communication section 110 function as a login screen data-transmitting unit.

Although in the above-described embodiment, the description has been given of the image forming apparatus as an example of the information processing apparatus, the present invention can also be applied to an information processing apparatus other than the image forming apparatus in a case where a computer is used via wireless communication from an external apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-264634 filed Dec. 2, 2011, which is hereby incorporated by reference herein in its entirety.

What is claimed is:

1. An information processing apparatus comprising:
   a reception unit configured to receive a request for acquiring screen data from an external apparatus, the request being sent via wireless communication;
   a determination unit configured to determine whether or not a security method used for the wireless communication is a predetermined security method; and
   a control unit configured to, in a case where said determination unit determines that the security method used for the wireless communication is not the predetermined security method, notify the external apparatus that access can be made when a specific input operation is performed on a console section provided in the information processing apparatus, and to cause the screen data responsive to the received request to be transmitted to the external apparatus on condition that the specific input operation is performed on the console section.

2. The information processing apparatus according to claim 1, wherein when identification information transmitted from the external apparatus for identifying the external apparatus is registered in advance, said control unit approves the request and causes the screen data responsive to the received request to be transmitted to the external apparatus.

3. The information processing apparatus according to claim 2, further comprising:
   a login screen data-transmitting unit configured to, when the request is sent from the external apparatus, transmit screen data for displaying a login screen to the external apparatus, and
   wherein when an administrator password set in advance is input via the login screen, said control unit approves the request and causes the screen data responsive to the received request to be transmitted to the external apparatus.

4. The information processing apparatus according to claim 1, further comprising:
   a setting unit configured to provide a setting in the information processing apparatus as to whether or not to unconditionally approve the request, and
   wherein when the setting for unconditionally approving the request has been provided in the information processing apparatus, said control unit causes the screen data responsive to the received request to be transmitted to the external apparatus.

5. The information processing apparatus according to claim 1, wherein when said determination unit determines that the security method used for the wireless communication is the predetermined security method, said control unit registers identification information for identifying the external apparatus.

6. A method of controlling an information processing apparatus, comprising:
   receiving a request for acquiring screen data from an external apparatus, the request being sent via wireless communication;

determining whether or not a security method used for the wireless communication is a predetermined security method; and notifying, in a case where it is determined that the security method used for the wireless communication is not the predetermined security method, the external apparatus that access can be made when a specific input operation is performed on a console section provided in the information processing apparatus, and causing the screen data responsive to the received request to be transmitted to the external apparatus on condition that the specific input operation is performed on the console section.

7. A non-transitory computer-readable storage medium storing a computer-executable control program for causing a computer to execute a method of controlling an information processing apparatus, wherein the method comprises:

receiving a request for acquiring screen data from an external apparatus, the request being sent via wireless communication;

determining whether or not a security method used for the wireless communication is a predetermined security method; and notifying, in a case where it is determined that the security method used for the wireless communication is not the predetermined security method, the external apparatus that access can be made when a specific input operation is performed on a console section provided in the information processing apparatus, and causing the screen data responsive to the received request to be transmitted to the external apparatus on condition that the specific input operation is performed on the console section.

* * * * *